Oct. 22, 1935.  A. H. ORCUTT  2,018,145
TRIMMING MECHANISM FOR GRINDING WHEELS
Filed May 9, 1935  3 Sheets-Sheet 1

A. H. Orcutt
INVENTOR

By Glascock Downing & Seebold
Attys.

Patented Oct. 22, 1935

2,018,145

UNITED STATES PATENT OFFICE 2,018,145

TRIMMING MECHANISM FOR GRINDING WHEELS

Arthur Hitchcock Orcutt, Handsworth, Birmingham, England, assignor to The Gear Grinding Company Limited, Handsworth, Birmingham, England Application May 9, 1935, Serial No. 20,677
In Great Britain April 11, 1935

4 Claims. (Cl. 125—11)

This invention has for its object to provide improved means for trimming the formed wheels used for such purposes as the grinding of the involute and other teeth of gear wheels.

The invention comprises the combination of a pair of spindles, each rotatable about a pair of axes at right angles to each other, and each provided at or near one end with a trimming tool, a lever on each spindle situated at or near the end remote from the trimming tool, an operating slide acting on both of the said levers, and fixed templates associated with the levers for controlling the movements of the spindles.

In the three accompanying sheets of explanatory drawings:—

Figure 1:
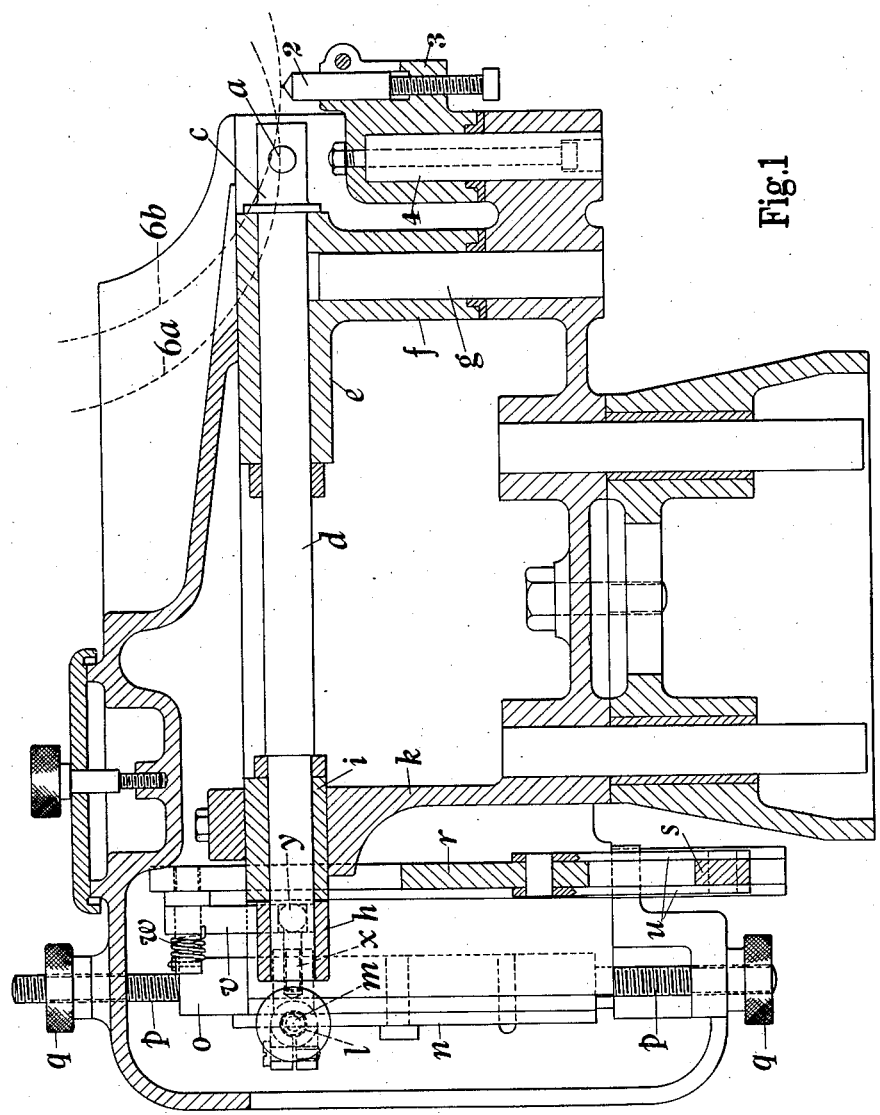
Figure 2:
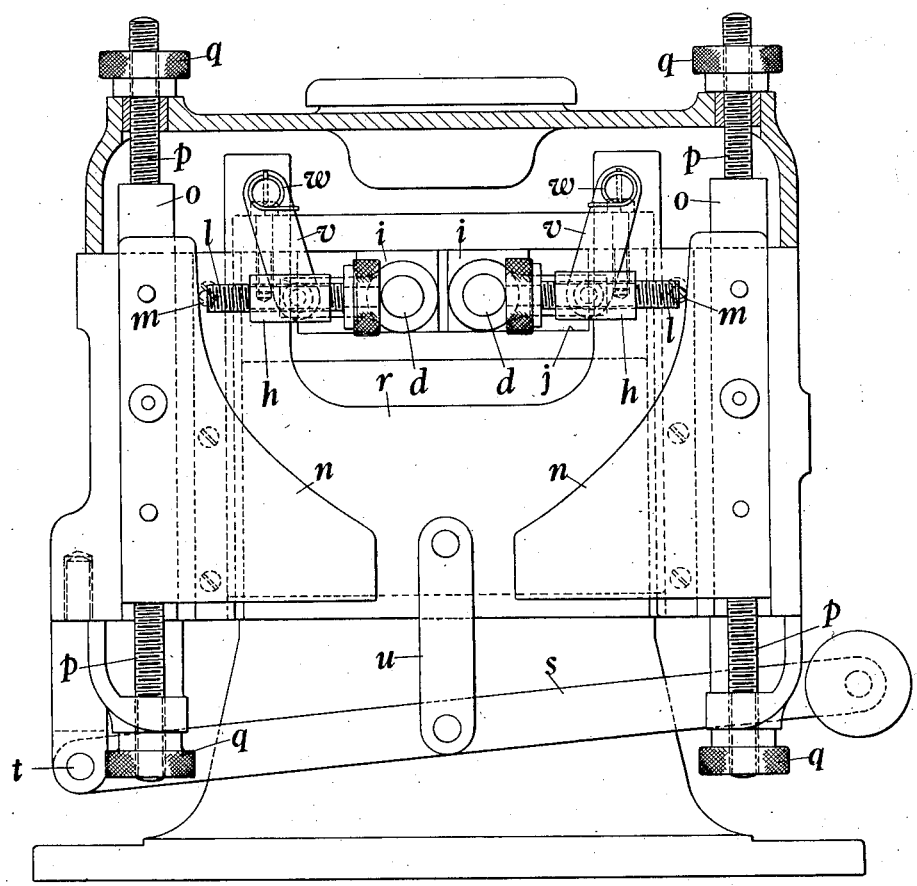
Figure 3:
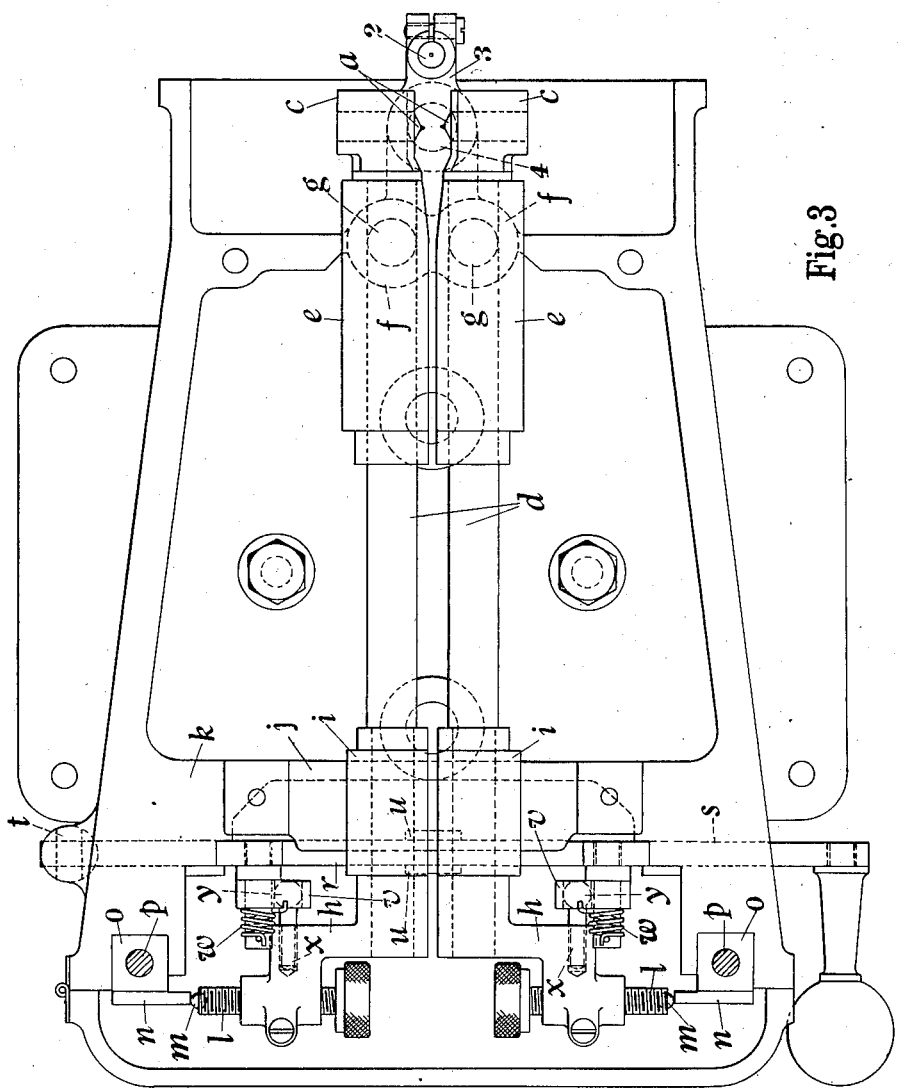

Figure 1 is a sectional side elevation, Figure 2 an end elevation (with part in section) and Figure 3 a plan (with the top cover removed) of a trimming mechanism constructed in accordance with the invention.

Referring to the drawings, two trimming tools $a$ (which may be provided with diamond or other hard points) are employed for acting on the formed side surfaces of the grinding wheel $b$ indicated by dotted lines in Figure (1). Each tool is secured in a holder $c$ formed at one end of a spindle $d$. The portion of the spindle $d$ adjacent to the tool is carried by a bearing $e$ which is formed with a hollow extension $f$ surrounding a fixed pivot $g$, so that the spindle $d$ can be moved about the axis of the pivot $g$ which is at right angles to the axis of the spindle $d$. The spindle is also rotatable about its own axis in the bearing $e$.

To the end of each spindle remote from the trimming tool is secured a lever $h$, and the part of the spindle adjacent to this lever is supported in a bearing $i$ which can slide horizontally in a guide $j$ arranged in the body part $k$ of the mechanism. Each lever $h$ is provided with an adjustable feeler $l$ in the form of a screw having a ball or other suitable tip $m$ which makes contact with the shaped edge of a fixed template $n$ carried in the body part $k$. Each template is adjustable relatively to the body part, and this condition is conveniently satisfied by attaching the template to a slide $o$ which is movable vertically to any desired position relatively to the spindle axes by screws $p$ and nuts $q$. The shape of the formed edges of the templates determines the arcuate paths traversed by the points of the trimming tools, and when it is required to change the curvature of the said paths, the templates already in the machine are removed and replaced by others of the required form.

Operating movement is imparted to the spindles simultaneously by a vertically movable slide $r$ carried in the body part of the mechanism, the slide being movable in both the downward and upward directions by a hand lever $s$ pivoted at $t$ and acting through a link $u$. Each lever $h$ is connected to an adjacent part of the slide $r$ by a link $v$ which is acted on by a strong spring $w$ adapted to keep the lever tip $m$ in contact with the edge of the template $n$. Attachment of each link $v$ to its lever $h$ is preferably effected in the manner shown by a pin $x$ secured to the lever and having a ball head $y$ which lies in and closely fits a hole in the link.

When the hand lever $s$ is depressed it moves the slide $r$ in the downward direction and causes an angular movement to be given to each lever $h$ which rocks each spindle $d$ about its own axis. At the same time, as the lever tips $m$ are held in contact with the edges of the templates by the spring $w$, the rocking movements of the spindles $d$ about their own axes is accompanied by rocking movements of the said spindles about the vertical axes of the pivots $g$, thus giving the required arcuate movements to the trimming tools. Upward movement of the hand lever $s$ causes the above described motions to be repeated in the reverse direction.

While the sides of the grinding wheel are being trimmed it occupies the position indicated by the dotted lines $6a$ Figure 1.

After the sides of the grinding wheel have been trimmed, it is usually desirable to trim the peripheral edge of the wheel. To enable this to be done the wheel is moved to the position indicated by the dotted lines $6b$ Figure 1, over another trimming tool 2 carried on a short lever 3 which is movable by hand about a vertical pivot 4 and mounted on the body part of the mechanism adjacent to and in front of the pivots $g$. A small angular movement of the lever 3 causes the tool 2 to traverse the thin periphery of the grinding wheel $b$ and so effect the required trimming action.

The invention is not limited to the example above described as subordinate details of design or construction can be varied to suit different requirements.

Having thus described my invention what I claim as new and desire to secure by Letters Patent is:—

1. In a trimming mechanism for grinding wheels, the combination of a pair of spindles, each rotatable about a pair of axes at right angles to each other, and each provided at or near one end with a trimming tool, a lever on each spindle situated at or near the end remote from the trimming tool, an operating slide acting on both of the said levers, and fixed templates associated with the levers for controlling the movements of the spindles, substantially as described.

2. In a trimming mechanism for grinding wheels as claimed in claim 1, the combination of a pair of spindles, a trimming tool holder at one end of each spindle, a bearing for each spindle adjacent to the said holder, a pivot carrying each of the said bearings and having its axis at right angles to the axis of the spindle, a lever on each spindle at the end remote from the trimming tool holder, a slidable bearing for each spindle adjacent to the said lever, a guide for supporting the slidable bearings, a pair of templates having shaped edges for co-operating with the levers on the spindles, a slidable operating member movable by hand, links connecting the said member to the levers on the spindles, springs acting on the links for holding the levers in contact with the templates, and hand operated means for actuating the said slidable operating member, substantially as described.

3. In a grinding wheel trimming mechanism as claimed in claim 1, the combination with each template, of a holder slidable on the body part of the mechanism, and means for adjusting independently each holder relatively to the body part, substantially as described.

4. In a grinding wheel trimming mechanism as claimed in claim 1, the combination with the tools for trimming the side faces of the wheel, of an additional pivoted holder for a tool arranged to trim the periphery of the wheel, substantially as described.

ARTHUR HITCHCOCK ORCUTT.